United States Patent [19]

Saceman

[11] Patent Number: 5,130,091

[45] Date of Patent: * Jul. 14, 1992

[54] RECIRCULATED ROOM AIR PURIFICATION

[75] Inventor: Don F. Saceman, Tampa, Fla.

[73] Assignee: Affiliated Innovation Management Inc., Tampa, Fla.

[*] Notice: The portion of the term of this patent subsequent to Jan. 7, 2009 has been disclaimed.

[21] Appl. No.: 771,451

[22] Filed: Oct. 3, 1991

Related U.S. Application Data

[60] Division of Ser. No. 420,800, Oct. 12, 1989, Pat. No. 5,078,972, which is a continuation of Ser. No. 211,974, Jun. 27, 1988, abandoned, which is a continuation-in-part of Ser. No. 185,588, Apr. 22, 1988, abandoned.

[51] Int. Cl.$^5$ ............... A61L 9/00; A61L 9/02; A61L 9/12
[52] U.S. Cl. ................................ 422/4; 47/66; 47/71; 422/5; 422/124
[58] Field of Search ............. 422/1, 4–5, 422/124, 168, 177; 47/66, 71, 1.4, 18, 39, 84, 58

[56] References Cited

U.S. PATENT DOCUMENTS

| | | | |
|---|---|---|---|
| 4,732,591 | 3/1988 | Tujisawa et al. | 422/124 X |
| 4,975,251 | 12/1990 | Saceman | 422/124 |
| 5,078,972 | 1/1992 | Saceman | 422/124 |

OTHER PUBLICATIONS

Houseplants, Indoor Pollutants, and Allergic Reactions, B. C. Wolverton, NASA Technology Labs., MS 395 Dec. 29, 1986.

*Primary Examiner*—Robert J. Warden
*Assistant Examiner*—Amalia Santiago
*Attorney, Agent, or Firm*—Charles A. McClure

[57] ABSTRACT

Treatment of recirculating room air with living green plants in air-permeable potting medium, so as to reduce the air content of gaseous and particulate liquid and/or solid contaminants while the air remains in the recirculation path. The air is conducted from and to a collection location to and from the treating location, where the air is passed upward through the potting soil and past the plant roots, out therefrom and past the plant leaves, and back to the collection location. The treatment location may be located at the entrance of the air into the room, at the exhaust of the air from the room, or elsewhere. Continuous or intermittent treatment of room air in such manner through such apparatus results in prompt and effective removal of cigarette smoke and other contaminants, at the same time rendering the room atmosphere more healthful for the persons therein by purifying the air they necessarily are breathing.

9 Claims, 2 Drawing Sheets

RECIRCULATED ROOM AIR PURIFICATION

This is a divisional of Ser. No. 420,800 filed Oct. 12, 1989, now U.S. Pat. No. 5,078,972, issued Jan. 7, 1992 which is a continuation of Ser. No. 211,794, filed Jun. 27, 1988, now abandoned, which is a continuation-in-part of Ser. No. 185,588, filed Apr. 22, 1988, now abandoned.

FIELD OF THE INVENTION

This invention relates to purification of air recirculated to one or more rooms or similar enclosures, especially by conversion or extraction of noxious gages or of liquid or solid particulate matter between successive recirculation thereto.

BACKGROUND OF THE INVENTION

Many apartments, houses, offices, and factories have central air circulation, so that the various rooms and similar enclosures receive warmed, cooled, or otherwise conditioned air not only from their own individual locations but from anywhere in the circulation path. Unless scrupulously cleaned—the rare exception—recirculated air carries contaminants from any room to many or most (in not all) of the other rooms to and from which it is recirculated. Smoking in any room can easily contaminate others, as can cleaning circuit boards with trichloroethylene, for example. This is a bad problem.

For many years, green plants have been considered beneficial to their environment, in that they take up carbon dioxide and give off oxygen. Potting soil or similar medium is customary as a nurturant. Activated carbon has long been known to adsorb onto its extensive surface a wide variety of contaminants form and may be included in potting medium for its effect upon liquid or gaseous contaminants.

Combination of such capabilities has been suggested heretofore, as referenced in my aforementioned patent application, but without practical success theretofore as to the air in rooms, much less as to air supplied to rooms from a circulating system, for example. It has remained for the present inventor to extend such teachings so as to achieve practical success in such purification, as below.

SUMMARY OF THE INVENTION

In general, the objects of this invention are accomplished by inserting in an air recirculation system a treating region having a living green plant with its roots in a potting medium, passing such air preferably upward through such potting medium, past the plant's roots, out therefrom over and past the leaves and to recirculation.

Apparatus for doing so comprises, for example, plant housing means containing foraminous means supporting air-permeable potting medium and one or more plants therein, and means for conducting air from and to a collection location outside the room into and through such foraminous means and potting medium, past the roots and over the leaves, and on through the recirculation path.

A primary object of the present invention is to treat room air subject to recirculation to purify it by steps compatible basically with, but differing in important part from, prior proposals and/or experimental methods.

Another object of this invention is to provide compositions especially useful in methods comprising such combination of steps.

A further object of the invention is to provide apparatus for economically practicing air purification methods according hereto.

Other objects of this invention, together with methods and means for attaining the various objects, will be apparent from the following description and the accompanying diagrams, which are presented by way of example rather than limitation.

DETAILED DESCRIPTION

Figure 1:
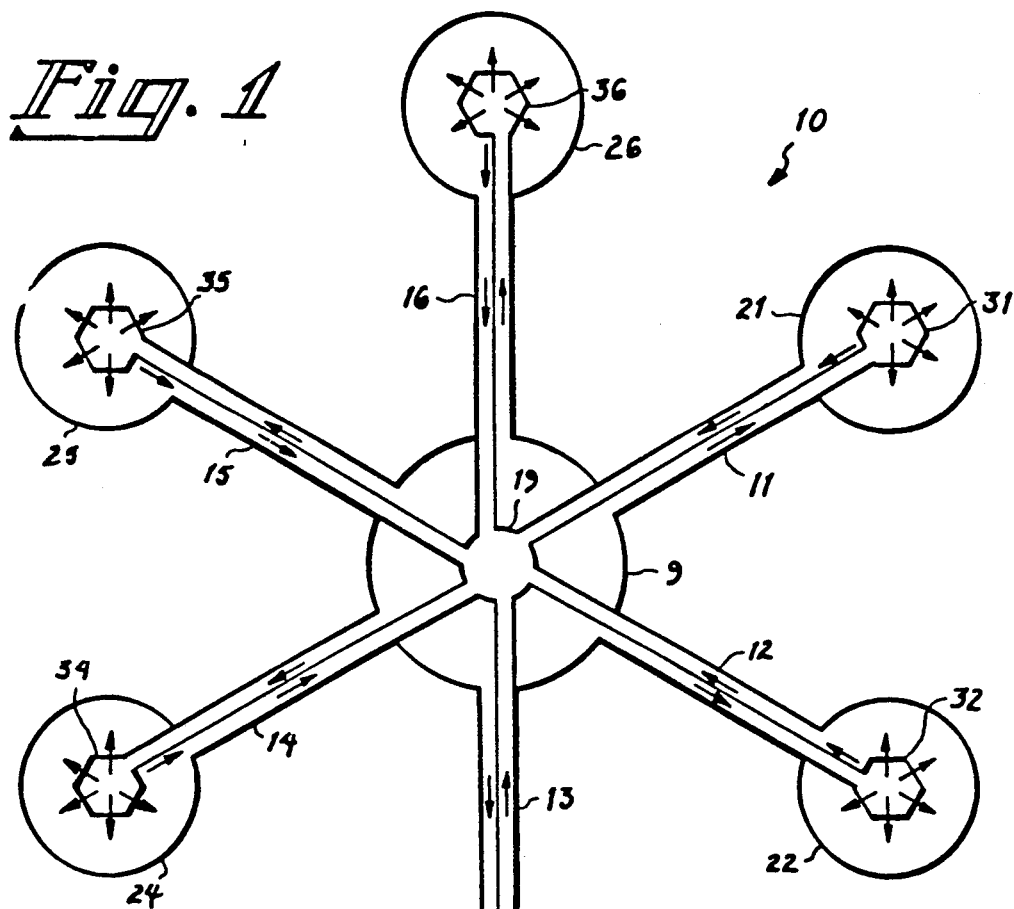
FIG. 1 is a schematic flow diagram for air according to the present invention.

FIG. 1 shows, in schematic form, air-purification system 10 of this invention configured for clarity of illustration rather than as indicative of their actual physical shapes of components.

Featured are plenum chamber 9 (shown circular) from which a half dozen air-conducting means 11 to 16 radiate outward like spokes of a wheel to conduct air to and from (arrows) the plenum chamber, which represents an air-collection location. At the outer extremities of the conducting means are a corresponding half dozen rooms or similar enclosures 21 to 26 (shown circular) within which are respective air-treating means 31 to 36 (shown hexagonal). Arrows radiating outward from the treating means, indicate airflow through the treating, and arrows within the path segments of each adjacent pair of radially oriented conduction means indicate the opposite flow directions of the air between the respective rooms and the plenum chamber.

Air-forwarding means, such as an air pimp or a centrifugal blower, is represented by small centralmost circle 19 to which arrows headed toward the plenum chamber are directed. Despite absence of arrows between it and the surrounding circle, it will be understood that air is passing between them so as to be pushed into the rooms or pulled from the rooms (or both). Arrows going between those two circles would be appropriate but are not shown.

Figure 2:
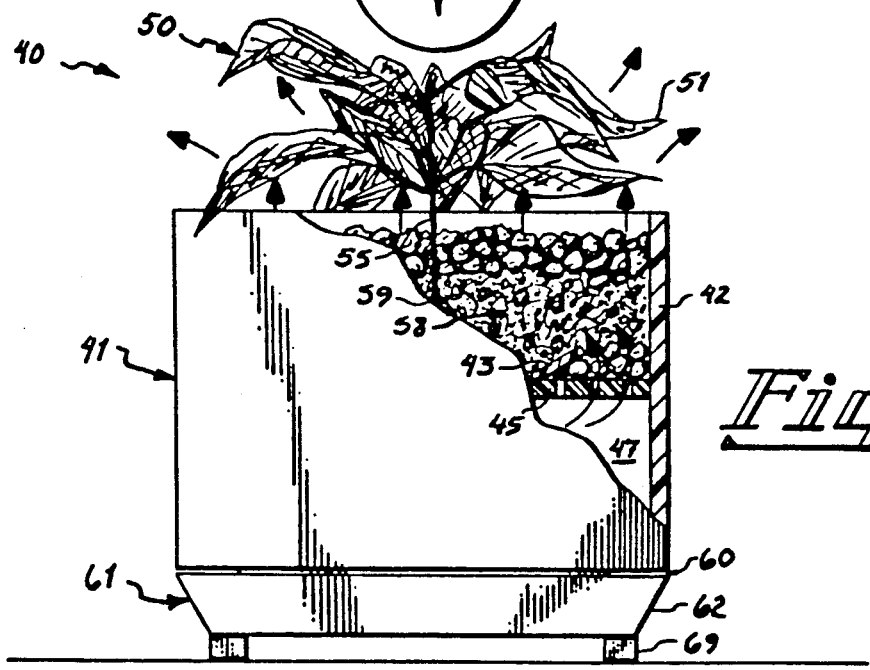
FIG. 2 is a transverse sectional elevation of apparatus with plants therein useful according to FIG. 1.

FIG. 2 displays housing means 41 of this invention, in end elevation and partly cut away to reveal part of the interior and contents. Foraminous plate 45 extends horizontally from wall to wall 42 and divides the interior into lower compartment 47 and an upper compartment wherein it supports plant receptacle channel 43, potting medium 58, and living plant 50 therein. The plant leaves 51 rise above the housing on stem 55 upstanding from roots 59. The sidewall is spaced by peripheral slot 60 above base portion 61 which rests on feet 69 and is disclosed further in the next view.

Figure 3:
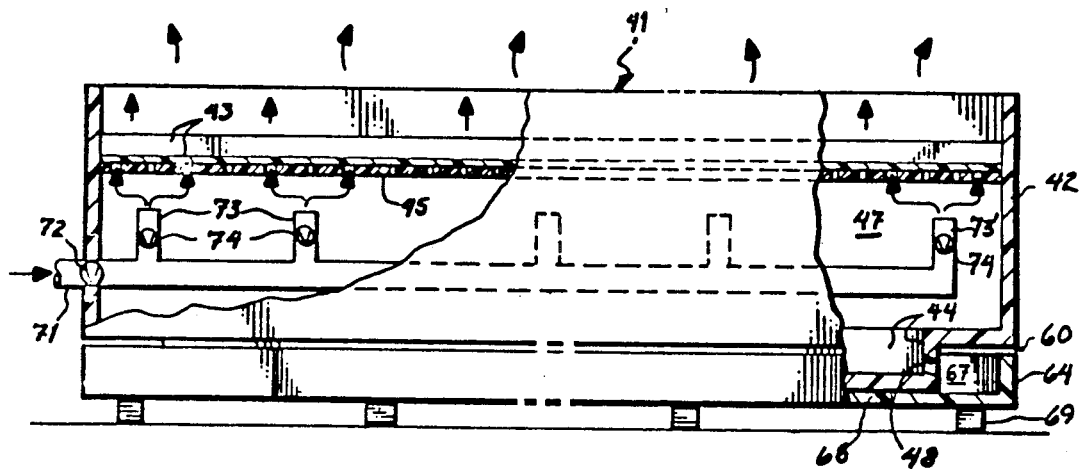
FIG. 3 is a longitudinal elevation of the apparatus of FIG. 2 partly sectioned away to show some of the interior.

FIG. 3 shows housing 41 lengthwise rather than endwise, and for a better showing of the interior omits the potting medium as well as the plant contents of FIG. 2 and is partly sectioned away. Also a length increment (broken lines) of the housing is omitted for economy of illustration and to suggest length variability. Foraminous plate 45 and shallow plant-receiving channel 43 extend along the entire length of the housing. Rising arrows indicate airflow through the foraminous plate and out from the housing top. The lower compartment of the housing is exaggerated in vertical dimension relative to the upper compartment for added clarity.

Visible here (hidden in FIG. 2) is inverted necklike portion 44 of the housing resting on the inside surface or floor of bottom 68 of the base portion. Weepholes 47 in the necked part enable water in the housing to overflow into annular space 67 of the base, where it can evaporate to the exterior via slot 60. The floor of the base may be raised relative to annular space 67 by an insert or otherwise to ensure such overflow transfer of excess water.

Air-circulation header 71 extends from the exterior at the left in FIG. 3 along the entire length of otherwise unoccupied compartment 47 of housing 41. The header receives air, suggested by an arrow, from one of the conducting means of FIG. 1 (not shown here) and at intervals along its length branches into successive risers 73 (and end riser 73') open upward to discharge air just below the foraminous means. The header has adjustable inlet valve 72 at its entrance to the housing, and each riser has its own valve 74 therein to enable airflow through the respective risers to be balanced appropriately.

Not shown in FIG. 3 are plants 40, which usually are arranged in one or more rows therein. The plants tend to extend their roots in the lengthwise direction of the housing and their supporting channel. No plan view is included, but it will be apparent that two or more rows of plants could be present, either in a single wide channel or in side-by-side multiple channels resting on the foraminous plate. Moreover, if desired, the housing could be subdivided into modular end sections and intermediate sections to enable window-boxes or the like to be mixed and matched in diverse lengths —and, if desired, in different designs of external walls.

Figure 4:
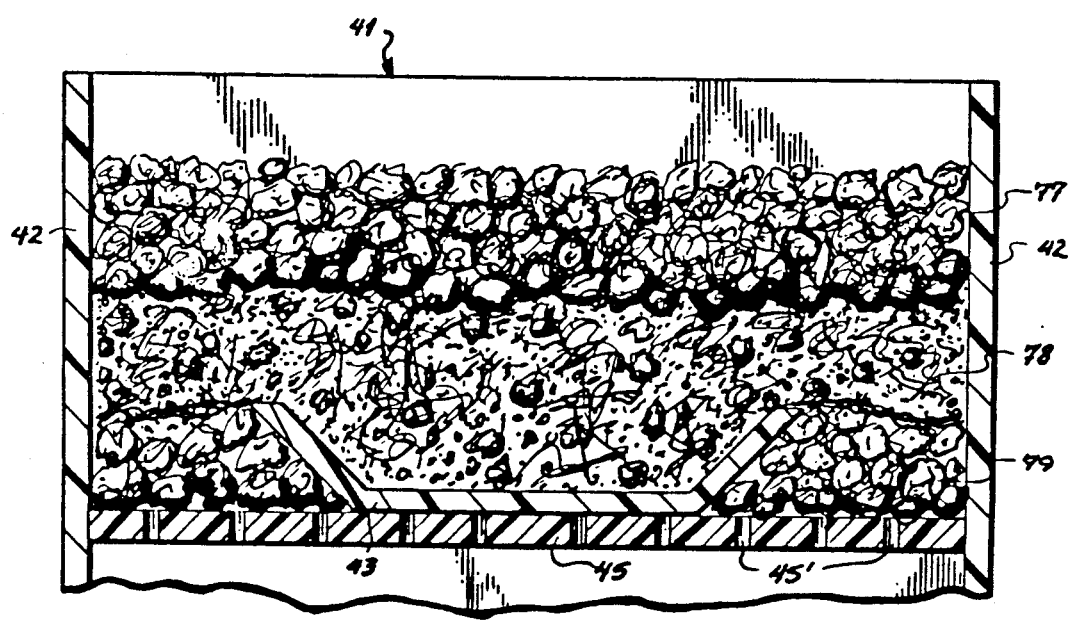
FIG. 4 is a rather schematic sectional elevation of potting medium supported in the foregoing apparatus, such enlarged.

FIG. 4 shows, in fragmentary endwise sectional elevation, the upper compartment of housing 41 with potting medium according to this invention. As noted, foraminous plate 45 extends from wall to wall and supports shallow plant-receiving channel 43, which does not extend from wall to wall. The annular space around the flared part of the channel is occupied by layer 79 of material in the form of chunks considerably larger than openings 45' through foraminous plate 45. Intermediate layer 78 of potting medium overlies lower layer 79, and upmost layer 77 overlies intermediate layer 78. The components of the respective layers are considered further below.

Operation of the air-treatment system of the invention is readily understood. Air is circulated to individual rooms from a collection location, usually centrally situated, and is exhausted to such collection location from the respective rooms, preferably by air-forwarding means at the collection location, as noted in description of FIG. 2. As each room usually has its own duct for supply of air thereinto, in new buildings the location of the duct can conveniently terminate at the header of the plant housing, whereas in existing buildings it can be extended to do so. Where a room has its own exhaust duct, the treating plant assembly can be provided with a collection hood thereover interconnected to the exhaust duct, with or without an auxiliary air-forwarding fan, and can draw its input air from the ambient air in the room, preferably with the aid of an air pump in the header and/or air pumps in the branching air outlets from the header.

Regardless of the manner or means whereby the air is supplied to and is exhausted from the apparatus of this invention, the air is purified in its passage through the layers of materials therein, including contact with the plant roots, and its outflow over the plant leaves. Such a treatment path is remarkably effective in removing contaminating gases, liquid and solid particulates, many of them acidic, including acid-coated carbonaceous dust particles. Cigarette smoke, a notable offender, is reduced in concentration promptly and effectively, depending upon the volume of room air to be so circulated and purified. Included among prominent removable materials are noxious aliphatic and aromatic aldehydes and ketones, halogenated hydrocarbons, and cyclic hydrocarbons. Such recital of contaminants so removable is exceedingly modest, as more extensive decontamination reports are accumulating with increasing use in diverse environments and in the course of studies undertaken to determine efficacy upon a wide variety of other contaminants. The physical-chemical reactions practiced during such purification can only be suggested at this time but doubtless include absorption and adsorption, chemical and electrochemical binding, oxidation and reduction, precipitation and solution, for example.

Plants of proven efficacy in such air purification include philodendrons and pothos, the peace lily, and the spider plant. Other effective plants will be readily identified as such usage increases and as interested investigators measure the benefits.

A suitable potting medium is a fundamental ingredient, of course. Soil not only should be sterilized before use, but also should be lightened to enhance its airpermeability. Preferred additives include carbonaceous granules and sphagnum moss. Their inclusion not only enhances permeability, cut the moss aide water retention, and granules of activated charcoal or the like assist in removal of possible contaminants in the soil. The overlying layer of carbonaceous material, which may be coal or charcoal of a mineral source as opposed to charcoal from hardwood or the like, precludes undesired growth—whether of the plant or of undesired organisms—at such location, as does the layer of similar material surrounding the channel-like plant-receiving receptacle.

The room air purifiers of this invention may be produced in a wide range of sizes; their relative efficacy increases with size. Window-box and other elongated shapes may be a foot to several feet in width and have no length limitation. These purifiers may extend along an entire wall of an interior site and also may be placed in tiered or terraced arrangements, for example.

No special materials of construction are required to produce such room air purifiers. Wood and anodized, plated, or otherwise stable metals are suitable, as are many ceramics. For economy, relatively inert polymeric material, such as polyhydrocarbons or polyvinyl chloride, are preferred. Containers of whatever organic composition may be coated or covered with the foregoing materials for esthetic and/or practical reasons.

Preferred embodiments and variants have been suggested for this invention. Other modifications may be made, as by adding, combining, deleting, or subdividing compositions, parts, or steps, while retailing all or some of the advantages and benefits of the present invention—which itself is defined in the following claims.

The claimed invention:

1. A method for treating air recirculated from a central location to a plurality of rooms to remove contaminants therefrom, comprising the steps of
    discharging air from a plurality of rooms to a central location and recirculating the air received in the central location back to said plurality of rooms;
    each of said plurality of rooms respectively having at least one treatment region, each treatment region being circumscribed laterally by wall means, and underneath by a foraminous means which extends toward the wall means, said foraminous means supporting a non-foraminous means thereon, said foraminous means further supporting thereabove a potting medium having therein the roots of a living green plant, and said non-foraminous means underlying a horizontally central part of the plant;
    passing the air recirculated to at least one of said rooms into and through the potting medium and past the roots of the plant supported in the respective treatment region of said at least one room for removing contaminants from said recirculated air, thereby forming treated air; and
    discharging the treated air back to said common central location.

2. The method of air treatment according to claim 1, wherein said contaminants include particulate contaminants.

3. The method of air treatment according to claim 2, wherein said particulate contaminants include tobacco smoke.

4. The method of air treatment according to claim 1, wherein said contaminants include gaseous contaminants.

5. Air treatment according to claim 1, wherein the potting medium comprises an air-permeable mixture including mineral carbonaceous material, soil, and sphagnum moss.

6. The method of air treatment according to claim 1, wherein said air treatment regions are located at an entrance to their respective rooms.

7. The method of air treatment according to claim 1, wherein said air treatment regions are located at an exhaust from their respective rooms.

8. The method of air treatment according to claim 1, wherein said recirculated air is passed up through the potting medium from thereunder.

9. The air treatment method according to claim 1, wherein gaseous contaminants removed include compositions from the class consisting of aliphatic and aromatic aldehydes and ketones, halogenated hydrocarbons, and cyclic hydrocarbons.

* * * * *